(12) United States Patent
Van Der Vleuten

(10) Patent No.: US 10,419,689 B2
(45) Date of Patent: *Sep. 17, 2019

(54) MAPPING BETWEEN LINEAR LUMINANCE VALUES AND LUMA CODES

(71) Applicant: KONINKLIJKE PHILIPS N.V., Eindhoven (NL)

(72) Inventor: Renatus Josephus Van Der Vleuten, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,525

(22) Filed: Nov. 30, 2018

(65) Prior Publication Data

US 2019/0098195 A1    Mar. 28, 2019

Related U.S. Application Data

(63) Continuation of application No. 14/903,294, filed as application No. PCT/EP2014/063890 on Jul. 1, 2014.

(30) Foreign Application Priority Data

Jul. 16, 2013   (EP) .................................... 13176612

(51) Int. Cl.
*H04N 5/235* (2006.01)
*H04N 19/186* (2014.01)
(Continued)

(52) U.S. Cl.
CPC .......... *H04N 5/2355* (2013.01); *H04N 5/202* (2013.01); *H04N 9/804* (2013.01); *H04N 19/186* (2014.11);
(Continued)

(58) Field of Classification Search
CPC ... G09G 2320/0276; G09G 2320/0673; G09G 2340/0428; G09G 2370/12;
(Continued)

(56) References Cited

U.S. PATENT DOCUMENTS 8,248,486 B1    8/2012  Ward
2012/0281009 A1   11/2012  Ward et al.
(Continued)

FOREIGN PATENT DOCUMENTS

WO    2005104035 A1   11/2005

OTHER PUBLICATIONS

Segall et al, "Tone Mapping Sei Message", Joint Videoteam of ISO/IEC, No. JFT-S087, 2006, pp. 1-12.
(Continued)

*Primary Examiner* — Phuoc Tran

(57) ABSTRACT

To enable better encoding of the currently starting to appear high dynamic range images for use in full high dynamic range technical systems (containing an HDR display, and e.g. in an HDR grading application), we invented a method of constructing a code allocation function for allocating pixel colors having pixel luminances to codes encoding such pixel luminances, in which the step of determining the code allocation function to be applied to at least one color coordinate of the pixel to obtain a code value, comprises constructing that function out of at least two partial functions, and similar methods at a receiving side, and apparatuses, and signals for communicating between the two sites. This method allows—in line with applicant's technical approach that HDR images should actually be communicated as a spectrum of differently regraded different dynamic range images of the same scene, e.g. a master HDR image and another image of the same HDR scene encoded with a different dynamic range and peak brightness than the master
(Continued)

HDR image, and one of these images should be communicated to receivers together with luminance mapping functions co-communicated in metadata allowing the calculation at the receiving side of the non-transmitted different dynamic range image—a better application of dynamically per scene optimizable luminance mapping functions.

11 Claims, 7 Drawing Sheets

(51) Int. Cl.
  *H04N 5/202* (2006.01)
  *H04N 9/804* (2006.01)
(52) U.S. Cl.
  CPC .............. *G09G 2320/0276* (2013.01); *G09G 2320/0673* (2013.01); *G09G 2340/0428* (2013.01); *G09G 2370/04* (2013.01); *G09G 2370/12* (2013.01)
(58) Field of Classification Search
  CPC .. G09G 2370/04; H04N 19/186; H04N 5/202; H04N 5/2355; H04N 9/804
  See application file for complete search history.

(56) References Cited

U.S. PATENT DOCUMENTS

| | | | |
|---|---|---|---|
| 2013/0148029 | A1 | 6/2013 | Gish |
| 2013/0328907 | A1 | 12/2013 | Ballestad et al. |
| 2014/0002479 | A1 | 1/2014 | Muijs et al. |
| 2014/0044372 | A1 | 2/2014 | Mertens |
| 2014/0363093 | A1 | 12/2014 | Miller et al. |
| 2015/0003537 | A1 | 1/2015 | Ward |
| 2016/0150145 | A1* | 5/2016 | Van Der Vleuten ............ H04N 5/2355 348/234 |

OTHER PUBLICATIONS

Banterle et al, "High Dynamic Range Imaging and Low Dynamic Range Expansion for Generating HDR Content", Computer Graphics Gorum, vol. 28, No. 8, 2009, pp. 2343-2367.

Salih et al, "Tone Mapping of HDR Images: A Review", Intelligent and Advanced Systems, 4th International Conference, 2012, pp. 368-373.

Li et al, "Compressing and Companding High Dynamic Range Images With Subband Architectures", ACM Tranactions on Graphics, vol. 24, No. 3, 2005, pp. 836-844.

Mai et al, "Optimizing a Tone Curve for Backward-Compatible High Dynamic Range Image and Video Compression", IEEE Transactions on Image Processing, vol. 20, No. 6, 2011, pp. 1558-1571.

Jinno et al, "High Contrast HDR Video Tone Mapping Based on Gamma Curves", IEEE Transaction on Fundamentals, vol. E94, No. 2, 2011, pp. 525-532.

"Adobe After Effects", Wikipedia, The Free Encyclopedia, Downloaded From Http://en.wikipedia.org/wiki/adobe_after_effects on July 15, 2013, pp. 1-6.

Miller et al, "Perceptual Signal Coding for More Efficient Usage of Bit Codes", SMPTE Annual Technical Conference & Exhibition, 2012, pp. 1-9.

Hunt, "Objective in Colour Reproduction", The Reproduction of Colour, Sixth Edition, Wiley, 2006, p. 172-173, 352-355, 438-441.

"REC. 709", Wikipedia, The Free Encyclopedia, Downloaded From http://en.wikipedia.org/wiki/ REC._709, on Jul. 15, 2012, pp. 1-4.

"sRGB", Wikipedia, The Free Encyclopedia, Downloaded From http://en.wikipedia.org/wiki/srgb on July 15, 2013, pp. 1-6.

"High-Dynamic-Range Imaging", Wikipedia, The Free Encyclopedia, Downloaded From http://en.wikipedia.org/wiki/high-Dynamic-range_imaging on Jul. 15, 2013 pp. 1-11.

"Post-Production", Wikipedia, The Free Encyclopedia, Downloaded From http://en.wikipedia.org/wiki/post_production on Jul. 15, 2013, pp. 1-3.

"Color Grading", Wikipedia, The Free Encyclopedia, Downloaded From http://en.wikipedia.org/wiki/color_grading on Jul. 15, 2013 pp. 1-6.

Noguchi, Takafumi Etal "A Microworld with its Construction Set", vol. 36, Issue 1, pp. 153-166, Jan. 1995.

\* cited by examiner

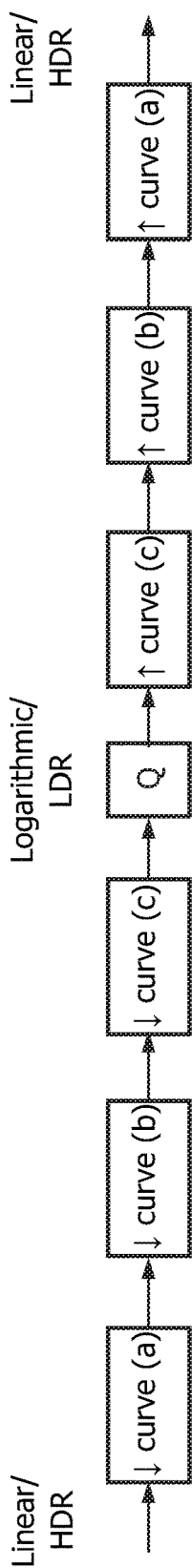
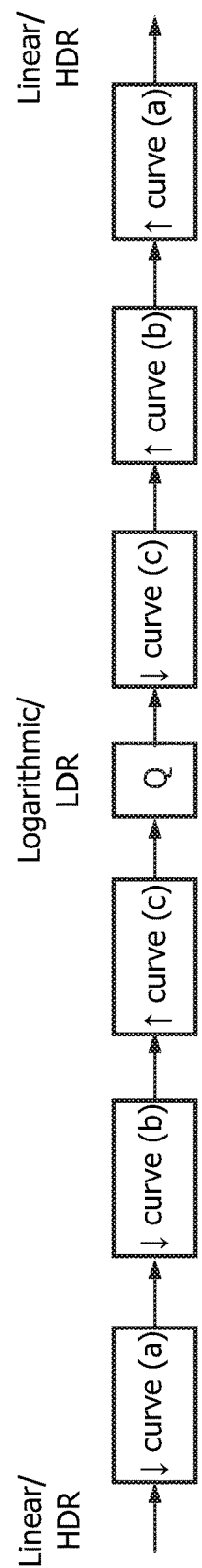

MAPPING BETWEEN LINEAR LUMINANCE VALUES AND LUMA CODES

CROSS-REFERENCE TO PRIOR APPLICATIONS

This application is a Continuation of application Ser. No. 14/903,294, filed Jan. 7, 2016, which is the U.S. National Phase application under 35 U.S.C. § 371 of International Application No. PCT/EP2014/063890, filed on Jul. 1, 2014, which claims the benefit of European Patent Application No. 13176612.3, filed on Jul. 16, 2013. These applications are hereby incorporated by reference herein.

FIELD OF THE INVENTION

The invention relates to mapping between linear luminance values and luma codes, and in particular, but not exclusively to encoding of one or preferably more (i.e. video) high dynamic range (HDR) image(s), fitting into the current frameworks of existing technology, like e.g. blu-ray disk storage, or HDMI cable connections.

BACKGROUND OF THE INVENTION

Conventionally, the dynamic range of reproduced images has tended to be substantially reduced in relation to normal vision. Indeed, luminance levels encountered in the real world span a dynamic range as large as 14 orders of magnitude, varying from a moonless night to staring directly into the sun. Instantaneous luminance dynamic range and the corresponding human visual system response can fall between 10.000:1 and 100.000:1 on sunny days or at night (bright reflections versus dark shadow regions). Traditionally, dynamic range of displays has been confined to about 2-3 orders of magnitude, and also sensors had a limited range, e.g. <10.000:1 depending on noise acceptability. Consequently, it has traditionally been possible to store and transmit images in 8-bit gamma-encoded formats without introducing perceptually noticeable artifacts on traditional rendering devices. However, in an effort to record more precise and livelier imagery, novel High Dynamic Range (HDR) image sensors that are capable of recording dynamic ranges of more than 6 orders of magnitude have been developed. Moreover, most special effects, computer graphics enhancement and other post-production work are already routinely conducted at higher bit depths and with higher dynamic ranges.

Furthermore, the contrast and peak luminance of state-of-the-art display systems continues to increase. Recently, new prototype displays have been presented with a peak luminance as high as 3000 cd/m$^2$ and contrast ratios of 5-6 orders of magnitude (display native, the viewing environment will also affect the finally rendered contrast ratio, which may for daytime television viewing even drop below 50:1). It is expected that future displays will be able to provide even higher dynamic ranges and specifically higher peak luminances and contrast ratios.

HDR images may for example be generated by combining a plurality of low-dynamic range (LDR) images. For example, three LDR images may be captured with different ranges and the three LDR images may be combined to generate a single image with a dynamic range equal to the combination of the dynamic ranges of the individual LDR images.

In order to successfully introduce HDR imaging and to fully exploit the promise of HDR, it is important that systems and approaches are developed which can handle the increased dynamic range. Furthermore, it is desirable if functions are introduced which allow various elements and functions of LDR image processing to be re-used with HDR. E.g. it would be desirable of some of the interfaces, communication means or distribution mediums defined for LDR could be reused for HDR images.

One important feature associated with HDR imaging is that of how to efficiently encode HDR image data.

Recently several HDR encoding technologies have been proposed, like e.g. the dual layer method of Dolby as disclosed in WO2005/1040035.

In order to e.g. efficiently process HDR images it is in many scenarios important that the larger dynamic range of HDR typically represented by a relatively large number of bits is converted into a representation using a substantially reduced number of bits.

For example, in some scenarios, it may be advantageous to view HDR images on a display having an input interface developed for LDR. Thus, it may be desirable to generate values that can be treated as LDR values e.g. by the display interface. In other scenarios, it may be desirable to encode the HDR values with lower bit rates and with some backwards compatibility to LDR.

In order to represent LDR images in a suitable format, it is often used to employ a code allocation function which maps from HDR linear luminance values to suitable quantized luma codes. The HDR linear luminance values are often represented as e.g. floating point values with a relatively high number of bits per value (e.g. 16 bits). In contrast, the quantized luma codes typically represent luma values by a relatively low number of bits (e.g. 8 bits), and often as integer values.

The difference between LDR and HDR is not just the size of the dynamic range, Rather, the relative distribution of intensities in most scenes is also substantially different for LDR and HDR representations.

Indeed, HDR images/video typically have a different intensity distribution than the conventional (LDR) images/video. Especially the peak-to-average luminance ratio of high-dynamic-range image data is much higher. Therefore, the currently applied code allocation curves or electro optical transfer functions (EOTFs) tend to be sub-optimal for HDR data. Thus, if a conventional LDR mapping from HDR luminance values to encoded luma values is used, a significant image degradation typically occurs. For example, most of the image content can only be represented by a few code values as a large number of codes are reserved to the increased brightness range which is however typically only used for a few very bright image objects.

As an example of a practical scenario, color grading (see reference [1]) or color correction is an integral part of commercial film or photography production. In particular, it is part of the post-production stage (reference [2]). The color grading artist, or colorist, operates in a color grading suite, which provides color grading/correction tools as well as a real-time preview of the effects of color grading tool operations on the image or video being graded/corrected.

With the introduction of HDR cameras and displays for shooting and displaying HDR images and video, the color grading suite also has to be made suitable for grading this high-dynamic-range content. To facilitate the introduction of HDR, it is beneficial to enable the color grading/correction with minimal changes to existing tools.

Current standard dynamic range video, intended to be displayed on a reference monitor of e.g. 100 cd/m$^2$ peak brightness, is usually encoded in current standard luma/ luminance domains, which are specified using their log curves or EOTFs (electro-optical transfer functions). Examples of this are the curves used for sRGB (reference [4]) or ITU Rec. 709 (reference [5]) logarithmic data. The video data is sent in this logarithmic domain from the color grading tool (e.g. software on a PC) over a hardware interface (typically HD-SDI) to the preview display. The bit depth of the hardware interface is usually limited to e.g. 8 or 10 bits.

HDR images/video typically have a different brightness (e.g. when defined as display rendered luminance) distribution than current standard dynamic range images. For example, while the current video content distribution typically peaks around 20% of peak brightness (which means that the luma codes are nicely spread around the half of e.g. 255 values), HDR content may oftentimes typically peak around a much lower percentage, e.g. 1%, of peak brightness (data of at least the darker regions of the HDR images spread around the code $\frac{1}{100}^{th}$ of code maximum). Thus, most of the relevant HDR content will be contained in only a few of the 8-bit or 10-bit video levels when it is encoded using current standard log curves. This will lead to severe and unacceptable quantization artifacts in the preview image, thus preventing the colorist to color grade/correct HDR images.

Accordingly, if conventional code allocations functions are used for HDR images in order to generate suitable codes for existing displays with such 8-bit or 10-bit input formats, a substantially reduced quality of the displayed image will result with e.g. most of the intensities present in the image being distributed over only a few input levels.

The code allocation function mapping linear light luminances as how they are to be seen upon display rendering to actual technical codes, or vice versa, have however largely been based upon LDR models (like gamma 2.2), but were optimal only for LDR displays of peak brightness of around 100 nit or cd/m² (henceforth both the terms nit and cd/m² will be used). If one so coarsely codes HDR video for transmission over a connection cable to a HDR display (e.g. peak brightness of 5000 nit) one risks seeing artefacts, such as banding in the darker parts of the video (e.g. banding in a dark blue sky, especially for fades).

Accordingly, in order to e.g. enable color grading of HDR images using the current color grading tools and interfaces, a different code allocation curve should be used for encoding the video data, such that a sufficient number of quantization levels is assigned to the most important video data.

However, finding a suitable code allocation function is not only critical but also difficult. Indeed, a challenge when determining code allocation functions is that of how to best map between the input luminance values and the luma codes. Indeed, this is a critical issue as the selected mapping has a strong impact on the resulting quality (e.g. due to quantization error). Furthermore, the impact on image quality may be dependent on the characteristics and properties of the images being encoded/decoded as well as the equipment used for rendering the images.

Of course, the simplest approach would be to simply use a uniform quantization. However, such an approach tends to result in suboptimal performance in many scenarios. Accordingly, code allocation functions have been developed wherein a non-uniform quantization has been applied. This may specifically be performed by applying a non-linear function (luma code mapping/tone mapping function) to the input luminance values followed by a linear quantization. However, as mentioned, it has been found that the defined functions in many scenarios provide a suboptimal result. For example, applying a code allocation function to HDR images in order to e.g. allow these to be processed by LDR circuits with a relatively low number of bits per value (typically 8 bits) tends to result in suboptimal conversion of the HDR image and specifically in the image values being concentrated around a few quantization levels/codes.

Although it may be possible to develop and define explicit functions that are specifically optimized for e.g. HDR images, this may be impractical in many scenarios. Indeed, such an approach requires individual and specialized functions to be developed for each scenario. Furthermore, it typically requires a large number of possible functions to be available for selection in order to compensate for differences in the images and/or equipment.

This further complicates operation and introduces additional resource requirements.

E.g. using dedicated functions not only requires the encoder to communicate which specific functions are used but in addition both the encoder and decoder need to store local representations of all possible functions. This will substantially increase the memory storage requirements. Another option would be for the encoder to encode data which fully defines the code allocation function used but such an approach will substantially increase the data rate.

Furthermore, using dedicated and explicit HDR code allocation functions will in many scenarios require substantial work in standardizing and specifying suitable functions. Furthermore, backwards compatibility will be a problem as existing equipment will not support new functions. E.g. existing circuitry will not be able to support new functions defined specifically to support HDR images.

Accordingly, an improved approach for providing and/or generating code allocation functions would be advantageous.

SUMMARY OF THE INVENTION

According to an aspect of the invention there is provided a method of constructing a code allocation function in accordance with claim 1.

The invention may allow facilitated or improved e.g. communication, storage, processing or manipulation of images in many scenarios.

The approach may in particular allow facilitated or improved e.g. communication, storage, processing or manipulation of HDR images in many scenarios, and may in particular allow HDR images to use existing functionality designed for LDR images. E.g. the code allocation function may allow improved HDR image representation over a link or functionality restricted to a reduced number of bits.

The use of partial functions as defined has been found to provide an improved image representation and/or facilitate operation in many embodiments. In particular, it may in many embodiments allow existing tone mapping functions to be reused for new applications and scenarios. In particular, it may in many embodiments allow existing functions e.g. defined or determined for LDR image processing and representation to be reused for mapping HDR linear luminances to luma representations providing a representation of the HDR image with fewer bits per pixel. Also, by using a few partial functions in combination, a large variety of code allocation functions can be supported while only requiring e.g. storage or communication of the few partial functions.

A luma value or code may be any non-linear function of a (colorless) luminance value. Thus, the luma value typically provides a monotonous non-linear representation of the corresponding luminance but the function relating the luma value to luminance may be any suitable and specifically non-linear function.

For the linear luminance value there is a direct linear relationship between the luminance value and the desired radiated light, i.e. a direct linear relationship between the linear luminance value and a corresponding light radiation from the pixel.

In some embodiments, the code allocation function may be part of an encoder. Pixel luminance values may be input to the code allocation function thereby generating quantized luma values. These values may be e.g. communicated, processed or encoded.

The partial functions may be sequentially applied. The application of the first partial function may preceed the second partial function, and specifically the first luma output value may in some embodiments be fed to the second partial function, i.e. the luma input value may be the first luma output value.

The code allocation function may include a quantisation of the second luma output value to generate the luma code values. The luma codes may be generated from the second luma output value in response to a quantisation which typically is a linear quantisation. The quantisation may provide a reduction of the number of bits representing each pixel luma value, and may include a conversion of representation e.g. from a floating point value to an integer value.

A maximum range for a value includes all values that the value can take. The maximum luminance range of pixel linear luminance input values includes all possible values of the linear luminance input value. The maximum luma range of a first luma output value includes all possible values of the first luma output value. The maximum luma range of the luma input value includes all possible values of the luma input value. The maximum luma range of the second luma output value includes all possible values of the second luma output value.

One or more of the maximum ranges may be the same. For example, all maximum luma ranges may be normalized to the [0;1] interval. The maximum linear luminance range may similarly be represented by values in the [0;1] interval.

The partial functions may be fixed functions or may be dependent on one or more parameters.

In accordance with an optional feature of the invention, there is provided claim 6.

This may provide an efficient and flexible system and may allow a source or transmitting end to flexibly optimize the code allocation function while allowing a sink or receiving end to adapt to the specific code allocation function used.

The representation may be encoded as any data indicative of a characteristic of the code allocation function, such as e.g. by encoding a representation of the entire code allocation function or an indication of one or more of the partial functions, and/or a parameter of these.

According to an aspect of the invention there is provided a method of determining a code mapping function for mapping from luma codes to pixel linear luminances function in accordance with claim 12.

The invention may allow facilitated or improved e.g. communication, storage, processing or manipulation of images in many scenarios.

The approach may in particular allow facilitated or improved e.g. communication, storage, processing or manipulation of HDR images in many scenarios, and may in particular allow HDR images to use existing functionality designed for LDR images. E.g. the code allocation function may allow improved HDR image representation over a link or functionality restricted to a reduced number of bits.

The code mapping function may include an inversion of at least part of a code allocation function used to generate the luma codes. The first partial function may be an inverse function of a mapping of a luma value to a luma code of a code allocation function used to generate the luma codes. The second partial function may be an inverse function of a mapping of a linear luminance value to a luma value of a code allocation function used to generate the luma codes.

The use of partial functions as defined has been found to provide an improved image representation and/or facilitate operation in many embodiments. In particular, it may in many embodiments allow existing tone mapping functions to be reused for new applications and scenarios. In particular, it may in many embodiments allow existing functions e.g. defined or determined for LDR image processing and representation to be reused for mapping HDR linear luminances to luma representations providing a representation of the HDR image with fewer bits per pixel, and for undoing this mapping at the receiving/sink side. Also, by using a few partial functions in combination, a large variety of code allocation functions can be supported while only requiring e.g. storage or communication of the few partial functions.

In some embodiments, the code mapping function may be part of a decoder. Luma codes may be received from e.g. a remote source and converted into linear luminance pixel values.

The partial functions may be sequentially applied. The application of the first partial function may preceed the second partial function, and specifically the luma output value of the first partial function may in some embodiments be fed to the second partial function, i.e. the input luma value of the second partial function may be the luma output value of the first partial function.

The code mapping function may include a de-quantisation of e.g. the luma code prior to mapping by the first partial function.

A maximum range for a value includes all values that the value can take. The maximum luminance range of pixel linear luminance input values includes all possible values of the linear luminance input value. The maximum luma range of a luma output value includes all possible values of the luma output value. The maximum luma range of the luma input value includes all possible values of the luma input value. The maximum luma range of the luma code includes all possible values of the luma code.

One or more of the maximum ranges may be the same. For example, all maximum luma ranges may be normalized to the [0;1] interval. The maximum linear luminance range may similarly be represented by values in the [0;1] interval. The partial functions may be fixed functions or may be dependent on one or more parameters.

In some embodiments, the partial functions may be generated in response to data received together with image data to be converted from luma codes to linear luminance values in accordance with the code mapping function.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

FIG. 6 schematically shows an embodiment of our invention where our total code allocation curve to be applied (luma Y, or non-linear R (G,B)=f [corresponding coordinate of linear color space representation of typically HDR input image]) is formed out of three partial mapping functional forms.

FIG. 7 schematically shows another embodiments, in which some parts have a compressive action on the lumas of a luminance range of the total code space, and others an expansive action in that subrange.

DETAILED DESCRIPTION OF THE DRAWINGS

Figure 1:
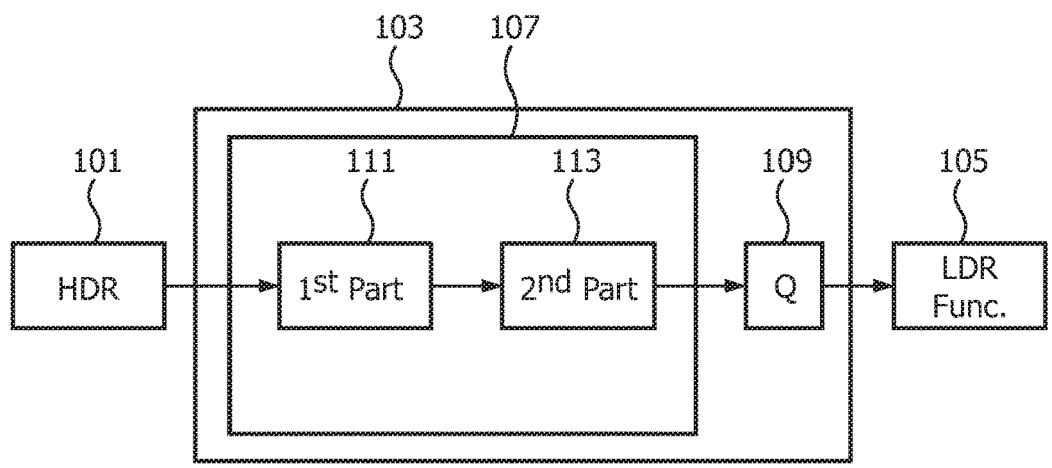
FIG. 1 illustrates an example of an apparatus for generating a code allocation function in accordance with some embodiments of the invention.

FIG. 1 illustrates an example of an HDR image processing system in accordance with some embodiments of the invention. The figure illustrates a source, encoding or transmitting side for an HDR system. In the example, a code allocation function is used to map from input values that are HDR linear luminances into luma codes. In the example, the code allocation function maps from input values represented by N bits into output values represented by M-bits where N>M. In addition, in the example, the input HDR linear luminance values are represented as floating point values (e.g. as 16 bit floating point values) and the output luma codes are represented by integers (e.g. as 8 bit integers).

In the example of FIG. 1, the system comprises a source 101 of an HDR image or video sequence.

Conventional displays typically use an LDR representation. Typically, such LDR representations are provided by a three component 8 bit representation related to specified primaries. For example, an RGB color representation may be provided by three 8 bit samples referenced to a Red, Green, and Blue primary respectfully. Another representation uses one luminance component and two chroma components (such as YCbCr). These LDR representations correspond to a given brightness or luminance range.

HDR specifically allows for significantly brighter images (or image areas) to be presented appropriately on HDR displays. Indeed, an HDR image displayed on an HDR display may provide a substantially brighter white than can be provided by the corresponding LDR image presented on an LDR display. Indeed, an HDR display may allow typically at least a four times brighter white than an LDR display. The brightness may specifically be measured relative to the darkest black that can be represented or may be measured relative to a given grey or black level.

The LDR image may specifically correspond to specific display parameters, such as a fixed bit resolution related to a specific set of primaries and/or a specific white point. For example, 8-bits may be provided for a given set of RGB primaries and e.g. a white point of 500 cd/m2. The HDR image is an image which includes data that should be rendered above these restrictions. In particular, a brightness may be more than four times brighter than the white point (e.g. 2000 cd/m2) or more.

High dynamic range pixel values have a luminance contrast range (brightest luminance in the set of pixels divided by darkest luminance) which is (much) larger than a range that can be faithfully displayed on the displays standardized in the NTSC and MPEG-2 era (with its typical RGB primaries, and a D65 white with maximum driving level [255, 255, 255] a reference brightness of e.g. 500 nit or below). Typically for such a reference display 8 bits suffice to display all grey values between approximately 500 nit and approximately 0.5 nit (i.e. with contrast range 1000:1 or below) in visually small steps, whereas HDR images are encoded with a higher bit word, e.g. 16 bit. In particular, HDR images typically contain many pixel values (of bright image objects) above a scene white. In particular, several pixels are brighter than two times a scene white. This scene white may typically be equated with the white of the NTSC/MPEG-2 reference display.

It should be noted that the difference between LDR and HDR images is not merely that a larger number of bits are used for HDR images than for LDR images. Rather, HDR images cover a larger luminance range than LDR images and typically have a higher maximum luminance value, i.e. a higher white point. Indeed, whereas LDR images have a maximum luminance (white) point corresponding to no more than 500 nits, HDR images have a maximum luminance (white) point corresponding to more than 500 nits, and often no less than 1000 nits, 2000 nits or even 4000 nits or higher. Thus, an HDR image does not merely use more bits corresponding to a higher granularity or improved quantization but rather corresponds to a larger actual luminance range. Thus, the brightest possible pixel value generally corresponds to a luminance/light output which is higher for an HDR image than for an LDR image. Indeed, HDR and LDR images may use the same number of bits but with the HDR image values being referenced to a larger luminance dynamic range/brighter maximum luminance than the LDR image values (and thus with the HDR images being represented with a more coarse quantization on a luminance scale).

The number of bits used for the HDR images X may typically be larger than or equal to the number of bits Y used for LDR images (X may typically be e.g. 12, 14 or 16 bit (per color channel if several of the channels are used), and Y may e.g. be 8, or 10 bits).

In order to allow HDR images to be used with LDR compatible equipment or interfaces, such as LDR compatible display interfaces or image encoding algorithms, a transformation/mapping may be required to fit the HDR values into a smaller range, e.g. a compressive scaling may be desired. Such conversions are typically rather complex and do not merely equate to a simple scaling of the luminance ranges as such a scaling would result in an image which would be perceived as unnaturally looking and typically with a large quantization error. Rather complex transformations are typically used and these transformations are often referred to using the term tone mapping.

In the system of FIG. 1, the HDR image is fed to a code allocation function 103 which maps the linear luminance values of the pixels of the HDR image into luma codes with a reduced number of bits being provided for each luma code than for each linear luminance value.

The code allocation function thus has an input value which is a linear luminance value of the HDR image.

A luminance value for a given pixel is indicative of a luminance of that pixel, i.e. it is indicative of an amount of light that should be provided radiated by that pixel (and thus of the brightness that will be perceived by the pixel. In the example, the luminance input value is linked to a given level in terms of a maximum luminance, i.e. in terms of a white point. For example, the input luminance may be provided as a value in a given range where the range is linked to a radiated luminance level. Specifically, the low end of the range may be linked to a black point e.g. corresponding to no light being radiated. The high end of the range may be linked to a white point. The white point is an HDR luminance, such as for example 5000 nits or 1000 nits.

Thus, the input to the code allocation function may be a luminance value which may be linked to an actual white point and black point corresponding to radiated light values. For example, the input luminance values may be given as a value in the range of [0;1] where the value 0 corresponds to a black point of e.g. 0 nits, and the value 1 corresponds to a white point of more than 500 nits, and often to no less than 1000 nits, 2000 nits or even 4000 nits or higher.

Thus, a given luminance value directly corresponds to a desired brightness.

The input luminance value from the HDR source 101 is in the example a linear luminance value. Thus, there is a direct linear relationship between the luminance value and the desired radiated brightness, i.e. a direct linear relationship between the linear luminance value and the corresponding light radiation from the pixel. For example, for a luminance value in the range of [0;1] where 0 corresponds to a black point of 0 nits and 1 corresponds to a white point of 5000 nits, a value of 0.25 corresponds to a brightness of 1250 nits, a value of 0.5 corresponds to a brightness of 2500 nits etc.

The input luminance value is represented by a relatively high number of bits and thus a relatively high accuracy. It may furthermore be represented as a floating point value. Thus, the linear luminance can be considered substantially unquantized.

In the example, the luminance value may specifically be an overall luminance of the pixel, i.e. it may reflect the brightness of the entire pixel rather than just a luminance of a color channel (such as an R channel luminance, G channel luminance or B channel luminance). For example, in the example, the pixel colors may be represented by a format comprising separate luminance and chroma components. For example, they may be provided in an Yuv format (in which a pixel value is represented by a luminance value Y and two chroma values uv). In this case, the code allocation function may be applied to the Y component (the luminance component) while keeping the chroma components uv constant. In some embodiments, the system may comprise a color representation converter to convert the input values from e.g. an RGB format to e.g. an Yuv format.

The linear luminance input may specifically be a linear luminance as referred to by SI and CIE.

The input signal to the code allocation function may thus be a luminance value associated with an actual brightness level, i.e. with a specific white point or maximum luminance. Specifically, the HDR source 101 may provide an image which has been color graded for the specific brightness level. E.g. a color grader may manually have adjusted the pixel colors/luminance values of the HDR image to get a desired aesthetically pleasing image when presented on an HDR display with a white point corresponding to the white point linked to the input luminance range.

The output of the code allocation function 103 is a luma value or code. A luma may be any non-linear function of a colorless luminance value. Thus, the luma value typically provides a monotonous representation of the corresponding brightness but the function relating the luma value to pixel brightness may be any suitable and specifically non-linear function. Thus, for the luma values, a value twice as large as another value cannot be assumed to correspond to a desired brightness being twice as large. In some scenarios, the luma value can be considered to not be directly linked to a given brightness range. For example, the available range for a luma value may be given, e.g. as a range from [0;1] or e.g. [0;255]. However, this range may not be linked directly with a given brightness range or indeed with a given black point or white point. For example, in some embodiments, the luma value may provide an abstract representation of the image brightness range or distribution and the exact mapping to specific brightness levels may be adapted depending on e.g. the brightness qualities of the display used to present the image.

The luma values may specifically correspond to the luminance notation from CIE_XYZ.

Thus, a luma value for a pixel may provide a representation of a brightness or luminance value for the pixel but may not have a predetermined or direct mapping to these values, and in particular may not represent a linear mapping. Rather, the luma value provides an encoding but in order to map the luma code back to specific brightness values, it is necessary to use a function defining the relationship between the luma codes and the original linear luminance values. In the encoder of FIG. 1, the code allocation function maps from the linear luminance input to luma codes. In order to map the luma codes back to luminance codes, an inverse code allocation function can be applied. Specifically, in order to map the luma codes back to the linear luminance range of the input to the encoder, the inverse of the code allocation function may be used to generate the luminance values. The mapping from luma codes to luminance values is in the following referred to as an inverse code allocation function. However, it should be noted that this function may also in some scenarios itself be referred to as a code allocation function.

The code allocation function 103 includes a non-linear mapping which maps the linear luminance values to a luma value which is then quantized. Specifically, the code allocation function includes a luma code mapping 107 which maps the linear luminance input value to a luma value. The mapping is a non-linear mapping. The luma value at the output of the luma code mapping 107 is fed to a quantizer 109 which performs a quantization of the luma value to generate an output luma code from the code allocation function 103.

The quantizer 109 performs a bit reduction such that the higher number of bits of the linear luminance value is reduced to the lower number of bits that allows the use of existing LDR functionality. Specifically, the quantizer 109 may reduce the number of bits of the luma value from N to M. The quantizer 109 specifically performs a uniform quantization.

The luma code mapping 107 is arranged to perform a non-linear mapping from the linear luminance input to the unquantized luma value. The combined effect of the luma code mapping 107 and the quantizer 109 may thus correspond to a non-uniform quantization.

The non-linear mapping may specifically ensure that the distribution of values is improved. For example, the non-linear mapping may be such that the darkest, say, 10% of the range of the input luminance values is mapped to the darkest, say, 70% of the range of the unquantized luma value. This will ensure an efficient encoding of the image characteristics of the HDR image using the reduced resolution typically associated with LDR images.

Thus, in the system of FIG. 1, the code allocation function is constructed from a luma code mapping 107 applied to the linear luminance input value to generate a luma value followed by a (linear) quantization of the luma value to generate the output luma code. The luma code mapping 107 provides a mapping which maps the input linear luminance to a luma value, i.e. the luma code mapping 107 may be considered to provide a tone mapping from linear luminance values to luma values.

However, in the system, the luma code mapping 107 is not merely constructed as a single function or mapping but rather is constructed from two partial functions 111, 113 or mappings which work together to provide the overall mapping of the luma code mapping 107. In the example of FIG. 1 the luma code mapping 107 is made up of only a first and second partial function 111, 113 but it will be appreciated that in other embodiments, the luma code mapping 107 may include further functions and especially may include additional mappings. For example, as will be described later, the code allocation function may include a variable mapping which can be modified by a user, indeed in some embodiments, the code allocation function may include a color grading controlled by a user.

Specifically, in the system of FIG. 1, the luma code mapping 107 comprises a first partial function 111 which receives the linear luminance input value from the HDR source 101. The first partial function 111 is arranged to map the linear luminance input value to a first luma value. The first partial function 111 defines an output luma value for all possible linear luminance input values, i.e. the entire maximum luminance range which can be represented by a linear luminance input value is mapped to an output luma range. Furthermore, the mapping of the first partial function 111 is such that it maps the maximum luminance range which can be represented by the linear luminance input value to a maximum luma range that can be represented at the output. Specifically, the lowest possible linear luminance input value is mapped to the lowest possible luma value. Similarly, the highest possible linear luminance input value is mapped to the highest possible luma value.

Furthermore, the mapping is a non-linear mapping. Typically, the mapping is such that subranges corresponding to typical brightness values are increased, and subranges that correspond to very high brightness values are compressed. Thus, the HDR distribution is mapped to a distribution which may be more suitable for LDR restrictions (specifically bit restrictions).

The mapping of the first partial function 111 is furthermore an invertible function. Specifically, the first partial function 111 provides a one to one mapping from the luminance input to the luma output, and indeed there exists a one-to-one mapping from the luma output to the luminance input. Thus, the first partial function 111 is a surjective or bijective function/mapping. For every possible linear luminance input value of the range of the linear luminance input, the first partial function 111 maps to exactly one luma value of the range of the luma output. Furthermore, an inverse of the first partial function 111 exists which for every possible luma value of the range of the luma output maps to exactly one linear luminance input value of the range of the linear luminance input.

Specifically, the linear luminance input value may be represented by (e.g. floating point) values in the interval from [0;1]. Similarly, the luma values may be represented by floating point values in the interval from [0;1]. The first partial function 111 may provide a bijective, non-linear mapping of the luminance input value range [0;1] into the luma output value [0;1].

In the example of FIG. 1, the output of the first partial function 111 is fed to a second partial function 113.

The second partial function 113 is arranged to map a luma value, and indeed in the specific example of FIG. 1, the luma value from the first partial function 111, to a second luma value. The second partial function 113 defines a luma output value for all possible luma input values, i.e. the entire maximum luma range which can be represented by the luma input value is mapped to an output luma range. Furthermore, the mapping of the second partial function 113 is such that it maps the input luma range to a maximum luma range that can be represented at the output. Specifically, the lowest possible luma input value is mapped to the lowest possible luma output value. Similarly, the highest possible luma input value is mapped to the highest possible luma output value.

Furthermore, the mapping is a non-linear mapping. In many scenarios, the mapping is such that subranges corresponding to typical brightness values are increased and subranges that correspond to very high brightness values are compressed. Thus, the HDR distribution is mapped to a distribution which may be more suitable for LDR restrictions.

The mapping of the second partial function 113 is furthermore an invertible function. Specifically, the second partial function 113 provides a one to one mapping from the luma input to the luma output and indeed there exists a one-to-one mapping from the luma output to the luma input. Thus, the second partial function 113 is a surjective or bijective function/mapping. For every possible luma input value of the range of the luma input, the second partial function 113 maps to exactly one luma value of the range of the luma output. Furthermore, an inverse of the second partial function 113 exists which for every possible luma value of the range of the luma output maps to exactly one luma input value of the range of the linear luma input.

Specifically, the luma input value may be represented by values in the interval from [0;1]. Similarly, the luma output values may be represented by values in the interval from [0;1]. The second partial function 113 may provide a bijective, non-linear mapping of the luma value range [0;1] into the luma output value [0;1]. The luma values may be floating point values.

The overall combined effect of the subsequent application of the first partial function 111 and the second partial function 113 is accordingly a non-linear mapping from the input linear luminance representation of an HDR signal to a representation that is more suitable for representation by fewer bits. Thus, a combined non-linear luma code mapping or tone mapping of input linear luminances to luma values is achieved In the system of FIG. 1, the second luma output value, i.e. the luma values from the second partial function 113 are fed to a quantizer 109. The quantizer 109 applies a quantization to the second luma value thereby generating output luma codes.

The quantization by the quantizer 109 reduces the number of bits used to represent each pixel brightness to fewer bits. For example, the luma value may be a 16 bit floating point value, and this may be quantized into 8 or 10 bit integers.

As a result of the code allocation function, luma codes can thus be generated which represent the HDR brightness with substantially fewer bits while allowing the fewer bits to provide a reasonable representation of the original HDR image. Indeed, the code allocation function may generate codes that can be handled by e.g. communication, encoding or image processing functionality that has been developed for LDR.

For example, a display interface may be defined to support e.g. image represented as Yuv data with e.g. 10 bits allocated for the Y component. Such a display interface may have been designed with LDR in mind. However, by mapping the HDR linear luminance to luma codes of 10 bits, the same display interface can also be used to support the HDR images.

As another example, an encoding algorithm may be generated based on Yuv representations using 8 bits for the Y component. By mapping the HDR linear luminance to eight bit luma codes, the same encoding algorithm can be used to support encoding of the HDR image.

Thus, the system of FIG. 1 effectively compresses the HDR linear luminance into a luma representation which in many scenarios allows the resulting signal to be handled by LDR functionality. In particular, the resulting signal may be communicated using a communication medium, channel or intermediate which has been designed for LDR.

Furthermore, this may be achieved while still allowing an efficient representation of the HDR characteristics. Thus, the image data is not converted to an LDR image which is then used. Rather, an HDR representation within an LDR compatible container can be used.

In many embodiments, a receiver may receive the luma code values and seek to generate a linear luminance HDR representation. For example, an HDR display receiving the luma values may seek to generate HDR linear luminance values which are then used to drive the display.

Figure 2:
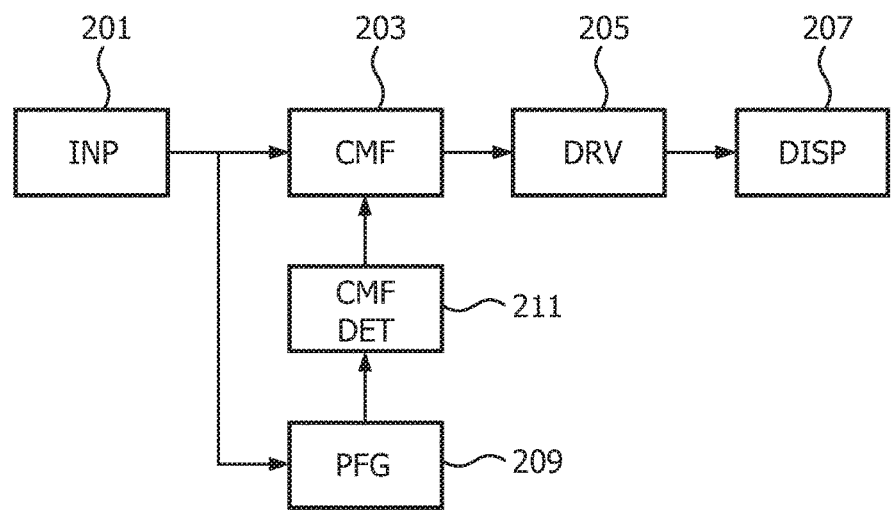
FIG. 2 illustrates an example of an apparatus for generating a code mapping function in accordance with some embodiments of the invention.

An example of such a sink, decoding or receiving end is illustrated in FIG. 2.

In the example, the receiver comprises an image receiver 201 which receives the coded values generated from the transmitting end of FIG. 1. It will be appreciated that in some embodiments, the luma codes may be received in an encoded signal and the data receiver 201 may comprise functionality for decoding the encoded signal to retrieve the luma codes. It will also be appreciated that the encoded signal may further comprise chroma values, e.g. a luma code and chroma values may be provided for each pixel in an image, e.g. each pixel may be represented in an Yuv format.

The received luma codes are fed to a code mapping function 203 which is arranged to map the receive luma codes into linear luminance values. The code mapping function 203 specifically provides a non-linear mapping which may generate linear luminance values that are suitable for HDR images.

The linear luminance values are in the example fed to a driver 205 which is arranged to drive an HDR display. Thus, in the specific example, the receiver may e.g. be an HDR display comprising functionality for receiving luma codes representing an HDR image but using a format that allows the luma codes to be compatible with an LDR communication channel, and for converting these luma codes to HDR linear luminance values.

In some embodiments, the code mapping function 203 may correspond to the inverse function of the code allocation function 103. Thus, the mapping performed by code mapping function 203 may reverse the operation of luma code mapping 107 when generating linear luminance values.

In other embodiments, the code mapping function 203 may comprise modified or additional mapping. For example, the mapping to HDR luminance values may be adapted to local characteristics or preferences, such as e.g. to the white point of the specific display or to e.g. specific user preferences.

However, in general, the code mapping function 203 is generated to take into account the code allocation function/luma code mapping 107 of the transmitting end. This approach thus allows a system wherein an HDR linear luminance range can be mapped to an LDR format compatible representation, communicated using a communication channel restricted to LDR formats, and then at the far end be mapped back to the HDR linear luminance range.

The code mapping function 203 is generated in response to two partial functions which in the following will be referred to as a first inverse partial function and a second inverse partial function. In the specific example, the first inverse partial function is the inverse function of the first partial function of the transmitter of FIG. 1 and the second inverse partial function is the inverse function of the second partial function 113 of the transmitter of FIG. 1.

The second inverse partial function accordingly provides a mapping of a received luma code to a luma value and the first inverse partial function provides a mapping of a luma value to a linear luminance value.

It will be appreciated that the first inverse partial function and second inverse partial function have corresponding characteristics to the first partial function 111 and the second partial function 113 as they are inverse functions.

Specifically, the first inverse partial function defines a non-linear invertible mapping of a maximum luma range of an input luma value to a maximum luminance range of pixel linear luminance input values.

Correspondingly, the second inverse partial function defines a non-linear invertible mapping of a maximum luma range of an input luma code to a maximum luma range of a luma output value.

Accordingly, in the example, the receiver comprises a partial function generator 209 which is arranged to determine the partial functions to be used in the receiver. Specifically, the partial function generator 209 may determine the first inverse partial function and the second inverse partial function.

In some embodiments, the first inverse partial function and second inverse partial function may e.g. be generated based on local information or e.g. a user input which defines the inverse partial functions.

However, in many embodiments the first inverse partial function and the second inverse partial function are determined based on control data received together with the image data. Specifically, the transmitter of FIG. 1 may include data defining the first partial function 111 and the second partial function 113. The data may in some embodiments simply define an identity of the two functions and the receiver of FIG. 2 may comprise a local store in which different functions are stored together with associated identifications. In some embodiments, the received data may furthermore comprise one or more parameters for the partial functions. For example, a gamma function may be identified and a gamma value may be provided in the received data stream as a parameter for the gamma conversion.

The partial function generator 209 is coupled to a mapping generator 211 which is arranged to generate the code mapping function 203 based on the determined partial functions. The mapping generator 211 may for example directly generate the code mapping function 203 as a sequential application of the second inverse partial function and the first inverse partial function.

Indeed, in some embodiments, the code mapping function 203 may be generated as a sequential application of the second inverse partial function and the first inverse partial function. Indeed, the received input luma codes may be fed to the second inverse partial function, and the luma output values of the second inverse partial function may be fed directly to the first inverse partial function. In some embodiments, the resulting linear luminance value may be used directly, and indeed this linear luminance will correspond to that of the original HDR image.

Figure 3:
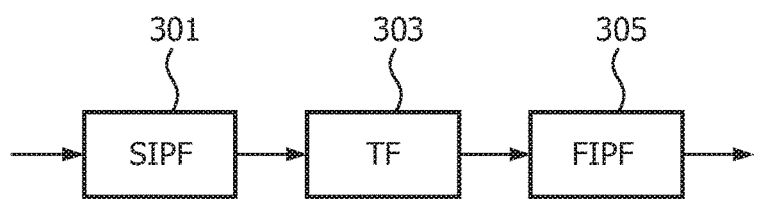
FIG. 3 illustrates an example of a code mapping function in accordance with some embodiments of the invention.

FIG. 3 illustrates an example of the code mapping function 203 wherein additional mapping may be performed. In the example, the luma codes are fed to the second inverse partial function 301 which applies a non-linear mapping to generate luma output values. The luma output values are fed to third function 303 which may perform a luma to luma mapping. This mapping may for example be an automated correction in accordance with local preferences, or may even be a manual color grading applied to the luma values. The resulting luma values are then fed to the first inverse partial function which maps these luma values into linear luminance values.

It will furthermore be appreciated that rather than directly applying the first inverse partial function and the second inverse partial function, a modified version of at least one of these may be used. For example, the first inverse partial function may comprise a gamma conversion and the first inverse partial function may be arranged to use a different gamma value than that applied in the first partial function 111. However, such an approach is equivalent to applying first the first inverse partial function followed by a second function which maps from the resulting values to values corresponding to the modified gamma function. In other words, even if applying e.g. a different gamma value, the information of the mapping in the encoder (e.g. by the first partial function 111) is still taken into account and thus the code mapping function 203 still depends on both the first inverse partial function and the second inverse partial function.

It will also be appreciated that in some embodiments and scenarios, the code mapping function 203 may also represent the mapping of the quantizer 109. Especially, if the quantizer includes a transformation of representation (e.g. from floating point to integer values), the effect thereof may be reversed by the code mapping function 203.

It will be appreciated that different approaches for determining the inverse functions and/or the code mapping function 203 may be used in different embodiments.

For example, as described above, in some embodiments the received data may directly identify the first inverse partial function and the second inverse partial function and the code mapping function 203 may be determined by applying these functions to the received data (e.g. in addition to other mapping).

In some embodiments, the receiver may determine the code mapping function 203 by first determining at least part of the code allocation function, and then typically determining the inverse of that part of the code allocation function.

For example, in some embodiments, the partial function generator 209 may first determine the first partial function 111 and the second partial function 113 (or one of them) used in the encoder. It may then proceed to determine the inverse functions, i.e. the first inverse partial function from the first partial function 111 and the second inverse partial function from the second partial function 113. The determination of the inverse functions may in some embodiments be based on predetermined knowledge of which functions are the inverse functions of the possible functions that may be used as the first partial function 111 or second partial function 113 by an encoder. In other embodiments, the definition of the first partial function 111 may e.g. be used to generate a look-up table of linear luminance values and corresponding output luma values of the first partial function 111. This look up table may then be used as an inverse function by using the stored luma values as the input parameter. I.e. for a given luma value, the linear luminance value linked in the look up table may be retrieved. The same approach may of course be used for the second partial function 113 and second inverse partial function.

In the following, some specific advantageous embodiments will be described in more detail including specifications of possible partial functions, code mapping functions, and code mapping function 203. In the examples, the functions and mappings are for brevity and simplicity referred to as curves.

In many embodiments, the code allocation function may be generated to provide a logarithmic curve, i.e. the code allocation function may correspond to a log curve. In the approach, the log curve is constructed by a simple concatenation of existing log curves (i.e. partial functions) since these curves are readily available/implemented in existing tools. In particular, it is proposed to use the sRGB, Rec709, and gamma curves as building blocks to construct a new log curve that is suitable for HDR. In its simplest form, the new curve is obtained by concatenating only two of these building blocks, but by concatenating three of these blocks, curves with even smaller (less visible) quantization artifacts may be obtained.

The "building block" approach enables us to (1) quickly construct and evaluate a large number of curves and (2) take advantage of curves that are already available in e.g. color grading tools.

Figure 4:
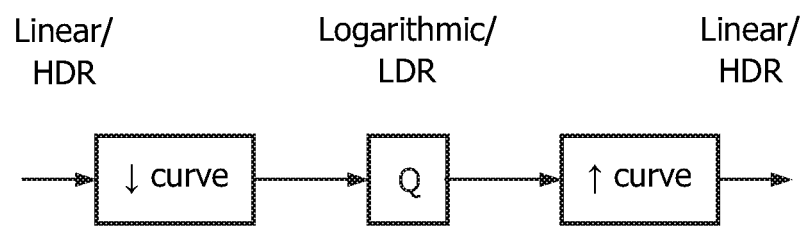
FIG. 4 schematically shows how one can apply a curve prior to a quantization phase to N bit in a coding, and a reverse curve to approximately reconstruct the original input signal.

A basic block diagram of applying a curve to an HDR signal is shown in FIG. 4 (note that all figures are just elucidating embodiments for explaining the more generic concepts of the approach).

In FIG. 4, the downward arrow J indicates a dynamic range reduction (if one were to directly render this image on a display (which is not typically required to be done so), one would see the more representative pixels of relatively darker and middle ranges coming closer together brightness-wise) by a certain curve, and the upward arrow T indicates a dynamic range expansion by the inverse curve. Q represents a quantization step. I.e. while we assume the signals and all processing upon them are defined in floating point (or high-accuracy integers, e.g. 12-bit or 16-bit), at position Q in the chain, the number of representation levels is reduced to e.g. 256 or 1024, such that the signal may be represented by e.g. 8-bit quantizer indices, which may be stored and/or transmitted and/or encoded over an interface of limited bit depth/bandwidth. In the following, we will assume all signals and curves are defined on the normalized float range of 0 . . . 1.

The diagram in FIG. 4 has been simplified in that it shows only a single signal path, corresponding to the luminance component. Specifically, the pixel color values may be provided as a luminance component and two chroma components, such as e.g. a Yuv representation. FIG. 4 (as well as FIGS. 1 to 3) illustrates the signal path for the luminance component (i.e. for Y).

Figure 5:
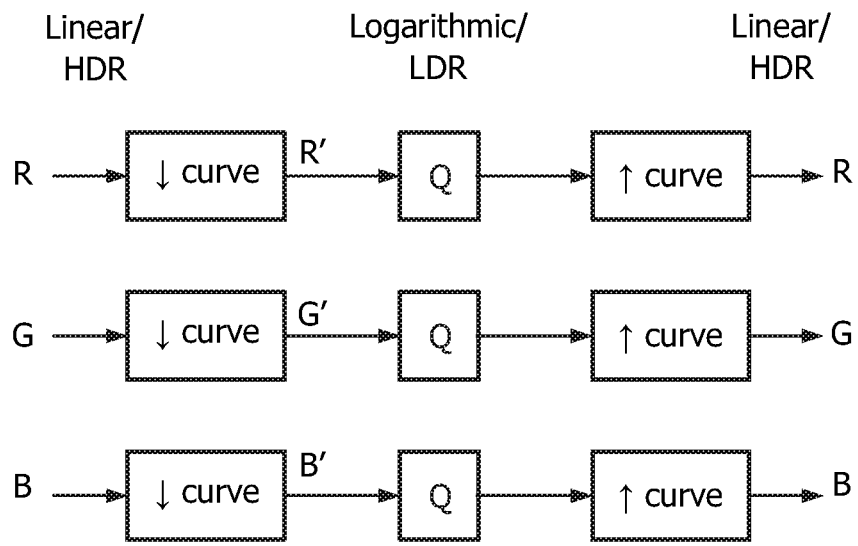
FIG. 5 schematically shows how typically such a strategy is applied to three color coordinates of a pixel, e.g. RGB.

In some scenarios where pixel values are provided as color channels, such as e.g. RGB or XYZ color representations, each of the color channels could be considered to provide an individual mono-chrome image. In such a consideration, the value of each color channel could be considered to correspond to a luminance representation of the associated monochrome image. Thus, in practice, the same log curve could be independently applied to each color component/channel, as shown in FIG. 5.

The approach combines several readily available curves into a combined curve that has a desired property. The particular property that we desire is specifically the suitability of the curve for quantizing an HDR signal with the lowest possible perceptual distortion. We establish the suitability of a curve for this purpose by applying it to several original (un-quantized floating point) HDR test images (which we have established to be sensitive to quantization artifacts) and visually evaluating the artefacts (i.e. differences with the original) in the quantized image (after applying the inverse curve) on a HDR reference display. We found that combining two or three curves as building blocks already provides quite suitable combined curves.

A generic example of combining, more specifically concatenating, three curves is shown in FIG. 6 (Example of concatenating three curves to build a combined curve as well as the inverse combined curve).

In some embodiments, all curves before quantization could work in the direction of lowering the dynamic range (output>=input on the normalized 0 . . . 1 ranges), indicated by the downward arrows 1, and all curves after quantization will increase the dynamic range (output<=input on the normalized 0 . . . 1 ranges), indicated by the upward arrows T.

However, since readily available building blocks may be applied (one of which may be a variable gamma curve, at least the gamma-power being optimized to work with some reference situation), one may also, and advantageously, apply individual building blocks to work in the opposite direction (i.e. if the first curve curves too steeply—i.e. it stretches the blacks strongly, and then levels off high in the available codes, one may use a second correction block that bends the curve of the final result less, so that the blacks are stretched less, which may be advantageously if we have a movie that e.g. doesn't go so deeply black anyway), as long as the overall combined curve maintains the desired downward or upward correction. An example to illustrate this is shown in FIG. 7, where curve (c) works "against" curves (a) and (b), i.e. locally stretches if the other compressed and vice versa.

We will now present various combined curves that have experimentally been determined to work well for quantization of an HDR signal displayed on a HDR reference display with a peak brightness of 5000 cd/m² (where the 0 . . . 5000 cd/m² range is normalized to the 0 . . . 1 range for applying the curves). Our reference display EOTF is a gamma of 1.25, which we have found to provide the correct dim-surround rendering intent and it is also the value that occurs in a traditional television chain using traditional reference displays (Cathode Ray Tubes); see [6]: sections 23.14, 19.13 and 11.9. The EOTF can be considered to be an additional gamma curve building block (with gamma equal to 1.25) that is concatenated (only) at the decoder/display side. Most of the curves were made using sRGB, Rec709, and gamma curve building blocks as these are widely implemented, but other curves could also be used as a building block. The curves, and therefore the building blocks, exist both in a normal and inverse form, depending on whether they are used on the source side, before quantization, to convert from a linear, more highly dynamic, representation to a "logarithmic"/compressed more low dynamic range representation, or on the sink side to convert from the "logarithmic" representation to a more linear representation. The exact definition of the curves used as building blocks is given in the Appendix: building block curve definitions.

Figure 8:
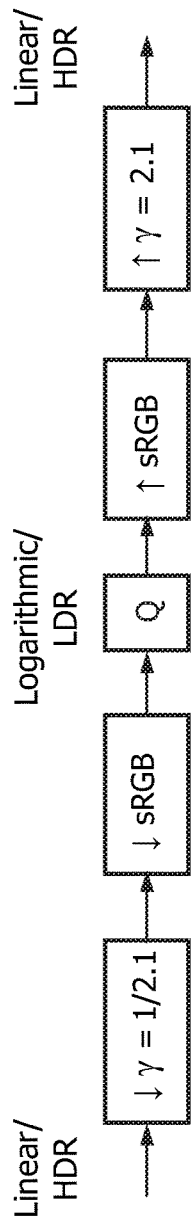
FIG. 8 schematically shows which first partial function we have found to give an optimized code allocation when HDR is typically in a range ending with a peak brightness of around 5000 nit, and a lower end around 0.1 nit or below, in case the second partial function is the code allocation function of the sRGB standard.

A first curve, constructed from a gamma and an sRGB building block (and their inverse) is shown in FIG. 8. Values of gamma around 2.1 (approximately the 2.0 . . . 2.2 range) work well in this chain. One may see the second curve-part as a pre-correction, or a post-tuning, compared to a reference, e.g. classical situation.

Figure 9:
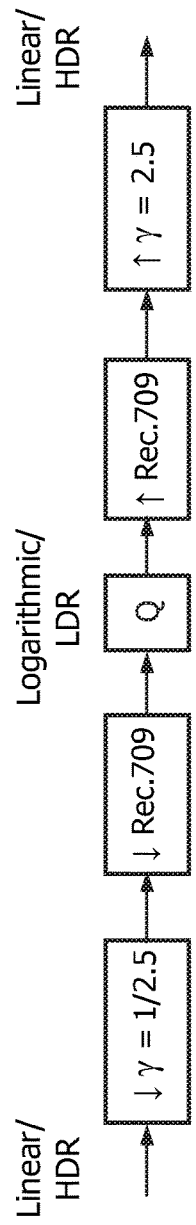
FIG. 9 schematically shows an optimally working first partial function for HDR encoding over lower bit amount code words (e.g. 8 bit, 10 bit, 12 bit) when one uses as second partial the rec. 709 code mapping.

A second two-block curve, constructed from a gamma and Rec.709 building block is shown in FIG. 9.

Finally, we also found experimentally that the PQ, where the ↑PQ is given by eq. (7) of [7], can be improved by adding a gamma curve building block.

The PQ function is defined as:

$$Y = L*((V^{\wedge}1/m - c1)/(c2 - c3*V^{\wedge}1/m))^{\wedge}1/n$$

In which Y is the resultant luma code allocated, V is the input (e.g. camera-captured or master graded for an optimal cinematic look) luminance scaled as a float within 0<=V<=1, L is a constant taken to be 10000 nit, m=78.8438, n=0.1593, c1=0.8359, c2=18.8516, c3=18.6875, an ^ is the power function.

This curve was defined with the pre-assumption one would never need to encode scene luminances above 10000 nit (or at least not render above 10000 nit), as one can always process brighter objects like the sun by (soft)-clipping within that range.

We may define as an exemplary embodiment from this a reference range which is defined always to a maximum of 5000 nits (brighter displays will then just (smartly) boost this encoded value to their peak brightness of e.g. 7000 nit. The skilled reader of course understands that although we teach embodiments with a white reference level of 5000 nits, we can similarly apply our teachings into a codec which caters for e.g. a 15000 nit reference luminance range to be standard codeable.

The PQ has been defined on the 0 . . . 10000 cd/m² range, but we e.g. only use the 0 . . . 5000 cd/m² part in our experiments (and normalized the input and output ranges for that limited range to 0 . . . 1).

To do this, in the Linear to Log conversion we multiply the 0 . . . 1 input range by 10000 (and then using only the 0 . . . 5000 input range) and then normalize the output to the 0 . . . 1 range again by dividing the output of the doPQ( ) function by doPQ(5000). In the Log to Linear conversion, we need to correspondingly scale the input range first by multiplying it by doPQ(5000) and then divide the output of doPQinv( ) by 5000 to normalize the output range also to 0 . . . 1

```
/* Linear to Log */
static double doPQ(double Y)
{
    double L = 10000;   /* range is 0..10000 nit */
    double m = 78.8438;
    double n = 0.1593;
    double c1 = 0.8359;
    double c2 = 18.8516;
    double c3 = 18.6875;
    double V,yln;
    yln = pow(Y*(1/L),n);
    V = pow((c2*yln + c1)/(c3*yln + 1),m);
    return V;
}
/* Log to Linear */
static double doPQinv(double V)
{
    double L = 10000;   /* range is 0..10000 nit */
    double m = 78.8438;
    double n = 0.1593;
    double c1 = 0.8359;
    double c2 = 18.8516;
    double c3 = 18.6875;
    double Y,v1m;
    if (V>0)
    {
        v1m = pow(V, 1/m);
        Y = L * pow((v1m - c1)/(c2 - c3*v1m),1/n);
    }
    else
    {
        Y=0;
    }
    return Y;
}
```

Figure 10:
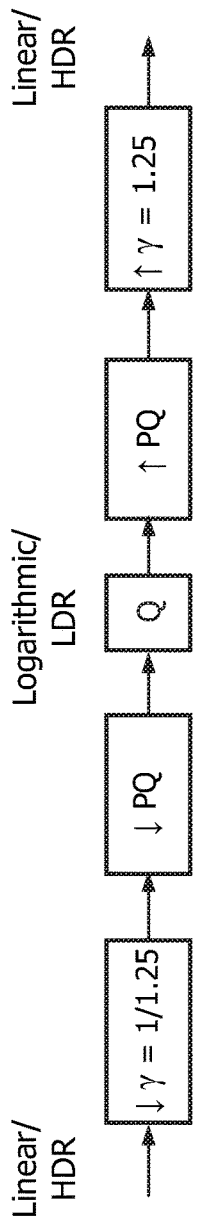
FIG. 10 schematically shows an optimally working first (or one could of course also use it last in actual application succession) partial when using Dolby's PQ function as second partial.

The best performing gamma value we found is around 1.25, as shown in FIG. 10. The PQ building blocks in FIG. 10 are the curves that operate on the 0 . . . 5000 cd/m² range, as mentioned above.

Figure 11:
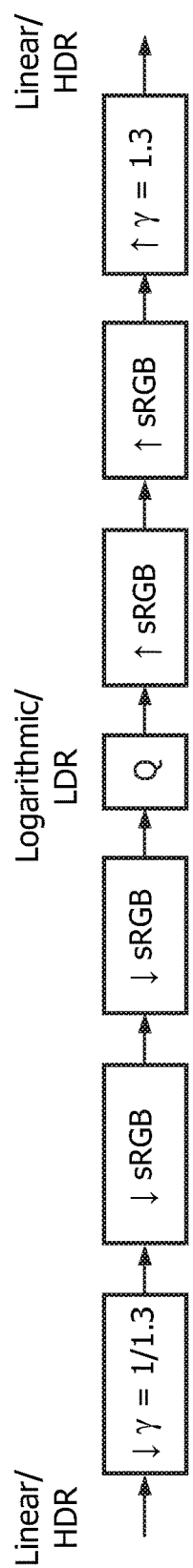
FIG. 11 schematically shows that one can also construct the total code allocation function out of more partial functions, in this case two sRGB mappings are used in succession, after a final gamma correction bending the allocation function in the correct final shape, so that sufficient codes exist for all luminance regions typically in an HDR image.
Figure 12:
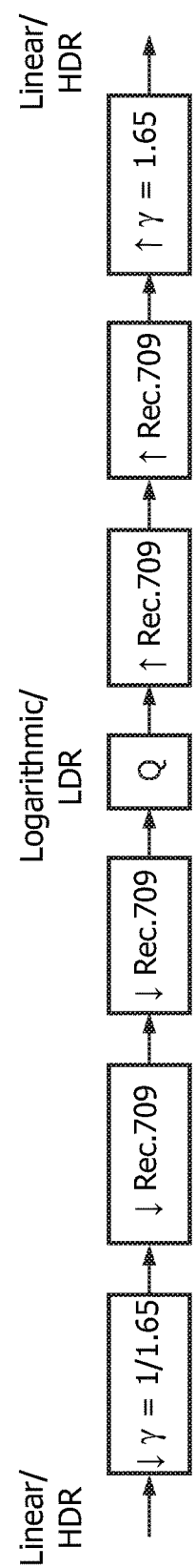
FIG. 12 schematically shows the same when using two classical Rec. 709 functions, but in a non-classical double application.

While the previously presented curves were combinations of two building blocks, we found generally better curves, i.e. curves with smaller perceivable quantization artefacts, using combinations of three building blocks. For example, FIG. 11 shows a curve constructed from two sRGB building blocks and a gamma block. FIG. 12 shows a similar design using two Rec.709 building blocks and a gamma block.

Figure 13:
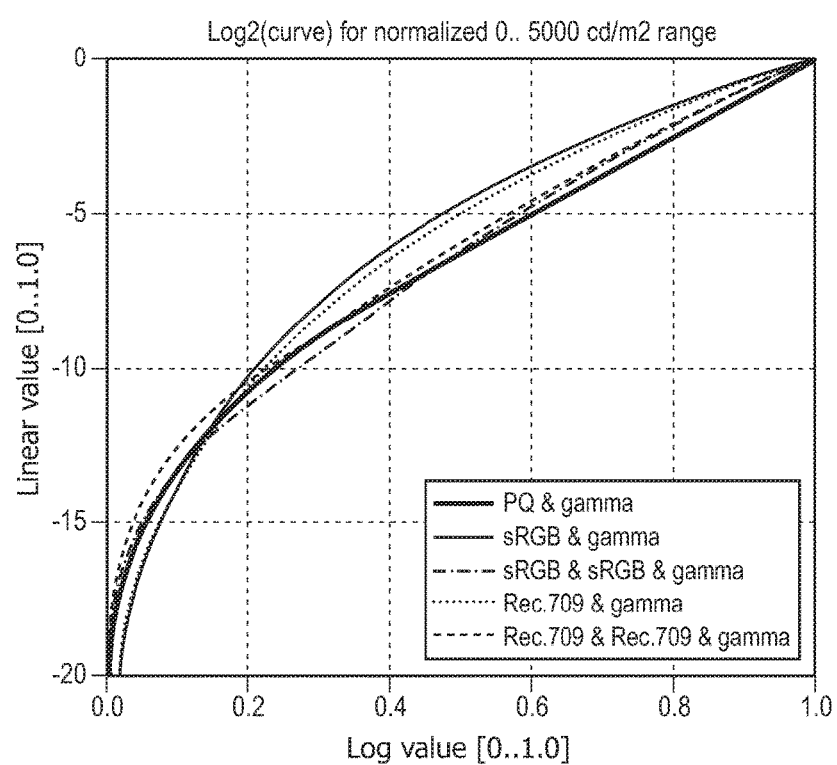
FIG. 13 schematically shows how such code allocation functions look over the code space, mapping X-axis input code values to output Y-axis luminances.

To provide a quick overview and comparison of the presented curves, they have been plotted together in FIG. 13. The horizontal axis represents the logarithmic/LDR domain, normalized to the 0 . . . 1 range. The vertical axis represents the linear/HDR domain, normalized to the range 0 . . . 1, where the value of 1 corresponds to a peak brightness of 5000 cd/m² in this case. For clearer visibility of the smaller linear values, the log 2( ) of the value is plotted instead of the actual value.

Figure 14:
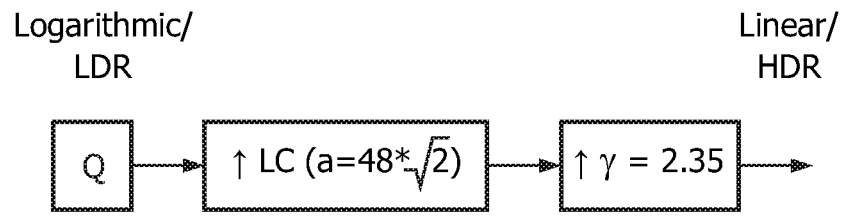
FIGS. 14-16 illustrates examples of a code mapping function.
Figure 15:
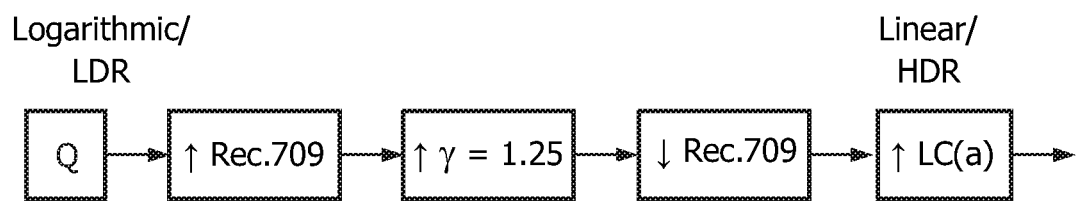
Figure 16:
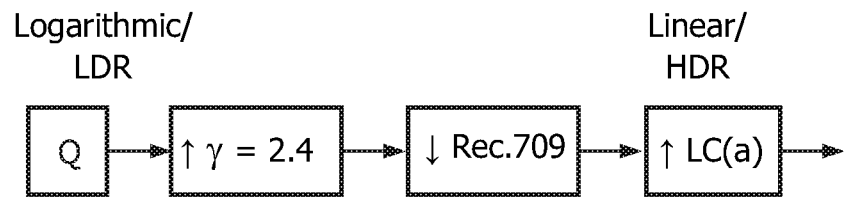

Other examples of suitable curves are illustrated in FIGS. 14-16. In the examples, the mappings are demonstrated with references to the code mapping functions, i.e. the mapping of luma codes to linear luminance values is shown.

These examples are based on a partial function referred to as LC (a) which is given as:

$$x = \frac{10^{\frac{v-d}{c}} - b}{a}$$

where x is the output value, normalized to the 0 . . . 1 range and v is the input value, normalized to the 0 . . . 1 range. The values a, b, c and d are design parameters that may be selected to provide the desired mapping.

What is transmitted or stored as a video signal may have the used code allocation defined in e.g. the following ways: two gamma functions perse (but one could also, with typically the reference/standard function being allocated only a type-indicator such as 1=sRGB, 2=709, etc., and then we encode only the differential/second block gamma function, i.e. typically only at least a gamma power and perhaps offset, and gain), but one could also encode (e.g. as a function, LUT, or approximative final gamma function with a resultant gamma [not necessarily the product of the two gammas, because of the dark offset] and offset and gain, which largely follows our proposed dual-block curve), a total code allocation function (being the successive application of all partial blocks).

The skilled person understands that combinations of what we teach can exist, and where what we have said in one paragraph is also relevant to other embodiments. None of the mere examples are supposed to be limitative, nor is particular wording if not clearly intended to be limitative. All methods functions can be similarly realized as apparatus constructions, and vice versa.

APPENDIX: BUILDING BLOCK CURVE DEFINITIONS

This appendix describes the individual building blocks in detail by giving their ANSI C code implementation. All inputs and outputs assume a normalized 0 . . . 1 range.

The sRGB building blocks are derived from the sRGB specification (IEC 61966-2-1:1999). The ↓sRGB curve is defined in Table 1 and the inverse ↑sRGB curve is defined in Table 2.

The Rec.709 building blocks are derived from Rec. ITU-R BT.709-5. The ↓Rec.709 curve is defined in Table 3 and the ↑Rec.709 curve is defined in Table 4.

The gamma building blocks (with parameter γ) are a simple power function, with γ<1 for the downward direction and γ>1 for the upward direction. The ↓γ and ↑γ building blocks are thus defined in Table 5.

TABLE 1

Definition of the ↓sRGB curve.

```
static double dosrgb(double L)
{
    double  gamma      = 1 / 2.4;
    double  V;
    double  gamgain    = 1.055;
    double  gamoffset  = -0.055;
    double  linlimit   = 0.0031308;
    double  lingain    = 12.92;
    if (L < linlimit)
    {
        V = L * lingain;
    }
    else
```

TABLE 1-continued

Definition of the ↓sRGB curve.

```
    {
        V = gamgain * pow(L, gamma) + gamoffset;
    }
    return V;
}
```

TABLE 2

Definition of the ↑sRGB curve

```
static double dosrgbinv(double L)
{
    double  gamma       = 2.4;
    double  V;
    double  invgamgain      = 1 / 1.055;
    double  invgamoffset    = 0.055;
    double  linlimit    = 0.0031308 * 12.92;
    double  lingain     = 1 / 12.92;
    if (L < linlimit)
    {
        V = L * lingain;
    }
    else
    {
        V = pow((L + invgamoffset) * invgamgain, gamma);
    }
    return V;
}
```

TABLE 3

Definition of the ↓Rec.709 curve.

```
static double doitu709(double L)
{
    double  gamma       = 0.45;
    double  V;
    double  gamgain     = 1.099;
    double  gamoffset   = −0.099;
    double  linlimit    = 0.018;
    double  lingain     = 4.5;
    if (L < linlimit)
    {
        V = L * lingain;
    }
    else
    {
        V = gamgain * pow(L, gamma) + gamoffset;
    }
    return V;
}
```

TABLE 4

Definition of the ↑Rec.709 curve.

```
static double doitu709inv(double L)
{
    double  gamma       = 1 / 0.45;
    double  V;
    double  invgamgain      = 1 / 1.099;
    double  invgamoffset    = 0.099;
    double  linlimit    = 4.5 * 0.018;
    double  lingain     = 1 / 4.5;
    if (L < linlimit)
    {
        V = L * lingain;
    }
    else
    {
        V = pow((L + invgamoffset) * invgamgain, gamma);
    }
```

TABLE 4-continued

Definition of the ↑Rec.709 curve.

```
    }
    return V;
}
```

TABLE 5

Definition of the gamma curve.

```
static double dogamma(double L, double gamma)
{
    return pow(L, gamma);
}
```

REFERENCES

[1] "Color grading," Wikipedia, the free encyclopedia, [Online]. Available: http://en.wikipedia.org/wiki/Color_grading. [Accessed 7 Aug. 2012].

[2] "Post-production," Wikipedia, the free encyclopedia, [Online]. Available: http://en.wikipedia.org/wiki/Post_production. [Accessed 26 Jun. 2013].

[3] "High-dynamic-range imaging," Wikipedia, the free encyclopedia, [Online]. Available: http://en.wikipedia.org/wiki/High-dynamic-range_imaging. [Accessed 27 Jun. 2013].

[4] "sRGB," Wikipedia, the free encyclopedia, [Online]. Available: http://en.wikipedia.org/wiki/SRGB. [Accessed 10 Aug. 2012].

[5] "Rec. 709," Wikipedia, the free encyclopedia, [Online]. Available: http://en.wikipedia.org/wiki/Rec._709. [Accessed 10 Aug. 2012].

[6] R. Hunt, The Reproduction of Colour, Sixth ed., Wiley, 2006.

[7] S. Miller, M. Nezamabadi and S. Daly, "Perceptual Signal Coding for More Efficient Usage of Bit Codes," in *SMPTE Annual Technical Conference & Exhibition*, Hollywood, Calif., 2012.

The invention claimed is:

1. A high dynamic range video encoder comprising an apparatus for determining a code allocation function comprising:

a calculation circuit arranged to determine a first partial function of at least two partial functions which defines a non-linear invertible mapping of an entire luminance range of a linear luminance input value to an entire luma range of a first output luma value;

a calculation circuit arranged to determine a second partial function to be consecutively applied to the luma value from the first partial function of the at least two partial functions, which second partial function defines a non-linear invertible mapping of an entire luma range of an input luma value being first output luma value to an entire luma range of a second output luma value; and a code allocation function construction circuit arranged to construct a code allocation function for allocating pixel colors having pixel luminances to luma codes encoding such pixel luminances from the at least two partial functions.

2. A high dynamic range video encoder of claim 1 comprising an output circuit to output luma code values together with chroma values which define the high dynamic range video, together with data defining at least one of the at least two partial functions.

3. A high dynamic range video encoder of claim 1 in which one of the at least two partial function circuits is a pre-determined tone mapping function circuit.

4. A high dynamic range video encoder of claim 1 in which one of the at least two partial functions is:
   a gamma curve circuit; or
   a Dolby perceptual quantizer function circuit; or
   a function circuit defined as:

$$Y = L\left(\frac{V^{\frac{1}{m-c1}}}{\left(c2 - c3 \cdot V^{\frac{1}{m}}\right)^{\frac{1}{n}}}\right)$$

where Y is a luma value, V is a linear luminance input value in the range of [0;1], L is a constant reflecting a white point, and m, n, c1, c2, and c3 are design parameters; or
   a function circuit defined as:

$$x = \frac{10^{\frac{v-d}{c}} - b}{a}$$

where x is the output value in the range of [0;1], v is the input value in the range of [0;1], and the values a, b, c and d are design parameters.

5. An apparatus for determining a code mapping function for mapping from luma codes to pixel linear luminances, the apparatus comprising:
   a first determiner circuit for determining at least two partial functions for the code mapping function; and
   a second determiner circuit for determining the code mapping function based on the at least two partial functions applied in consecutive order; wherein
   the code mapping function circuit provides a non-linear mapping of luma codes to pixel linear luminances which is defined from the following two partial functions to be applied in consecutive order:
   a first partial function circuit of the at least two partial functions defining a non-linear invertible mapping of an entire luma range of an input luma code to an entire luma range of a luma output value; and
   a second partial function circuit of the at least two partial functions defines a non-linear invertible mapping of an entire luma range of a luma input value to an entire luminance range of a pixel linear luminance value.

6. A high dynamic range video decoder comprising an apparatus of claim 5.

7. A high dynamic range video decoder comprising an apparatus of claim 5, and an input circuit for receiving an image with pixel colors encoded by luma code values together with chroma values, and data defining at least one of the at least two partial function circuits.

8. A high dynamic range video decoder of claim 5 arranged to apply the code mapping function circuit based on the at least two partial function circuits to the luma code values.

9. A high dynamic range video decoder of claim 5 in which the input circuit is connected to a storage medium, or a video cable or wireless video connection.

10. A high dynamic range video decoder of claim 5 in which one of the at least two partial function circuits is a pre-determined tone mapping function circuit.

11. A high dynamic range video decoder of claim 5 in which one of the at least two partial functions is:
    a gamma curve circuit; or
    a Dolby perceptual quantizer function circuit; or
    a function circuit defined as:

$$Y = L\left(\frac{V^{\frac{1}{m-c1}}}{\left(c2 - c3 \cdot V^{\frac{1}{m}}\right)^{\frac{1}{n}}}\right)$$

where Y is a luma value, V is a linear luminance input value in the range of [0;1], L is a constant reflecting a white point, and m, n, c1, c2, and c3 are design parameters; or
    a function circuit defined as:

$$x = \frac{10^{\frac{v-d}{c}} - b}{a}$$

where x is the output value in the range of [0;1], v is the input value in the range of [0;1], and the values a, b, c and d are design parameters.

* * * * *